United States Patent [19]
Park et al.

[11] Patent Number: 5,861,822
[45] Date of Patent: Jan. 19, 1999

[54] WIRE/WIRELESS KEYBOARD, AND CONTROL METHOD THEREFOR

[75] Inventors: Chan Kyung Park; Jee Sung Lee, both of Suwon-si, Rep. of Korea

[73] Assignee: Samsung-Electro Mechanics Co., Ltd., Kyongki-do, Rep. of Korea

[21] Appl. No.: 921,597

[22] Filed: Sep. 2, 1997

[30] Foreign Application Priority Data

Apr. 7, 1997 [KR] Rep. of Korea .................. 1997-12728

[51] Int. Cl.⁶ .................................. H03K 17/94
[52] U.S. Cl. ........................... 341/22; 341/32; 341/176; 341/26; 345/168; 359/142; 455/74.1
[58] Field of Search ............................. 455/74.1, 186.2; 359/142, 145; 345/168, 169; 341/22, 32, 176, 24, 25, 26; 340/870.69, 870.72

[56] References Cited

U.S. PATENT DOCUMENTS

| | | | |
|---|---|---|---|
| 4,752,949 | 6/1988 | Steinbeck et al. | 455/74.1 |
| 5,189,543 | 2/1993 | Lin et al. | 359/142 |
| 5,387,994 | 2/1995 | McCormack et al. | 340/825.72 |
| 5,410,305 | 4/1995 | Barrus et al. | 341/22 |
| 5,724,106 | 3/1998 | Autry et al. | 341/176 |
| 5,737,107 | 4/1998 | Umeda | 340/825.72 |

FOREIGN PATENT DOCUMENTS

| | | |
|---|---|---|
| 4-268910 | 9/1992 | Japan . |
| 5-19927 | 1/1993 | Japan . |
| 5-9452 | 4/1993 | Japan . |
| 5-113840 | 5/1993 | Japan . |
| 6-12170 | 1/1994 | Japan . |

*Primary Examiner*—Michael Horabik
*Assistant Examiner*—Timothy Edwards, Jr.
*Attorney, Agent, or Firm*—Lowe Hauptman Gopstein Gilman & Berner

[57] ABSTRACT

A wire/wireless keyboard and a control method therefor. The keyboard can be used as a wire keyboard if a main body connecting section of the keyboard is connected to a computer body, and the keyboard can be used as a wireless keyboard if the main body connecting section of the keyboard is disconnected from the computer body. The connection status between the computer body and the main body connecting section of the keyboard is automatically judged. If it is judged that they are connected, then the power of the computer body is selected, and the wire mode is executed. On the other hand, if it is judged that they are disconnected from each other, then the internal battery is selected to supply the power from the battery, and the wireless mode is executed. Therefore, the keyboard can be used as both a wire keyboard and as a wireless keyboard. Particularly, under a wireless mode, only if there is a key inputting, the control section is waken up, and therefore, the consumption of the battery power can be minimized.

13 Claims, 5 Drawing Sheets

FIG. 6

WIRE/WIRELESS KEYBOARD, AND CONTROL METHOD THEREFOR

BACKGROUND OF THE INVENTION

1. Field of the Invention

The present invention relates to a keyboard for use in a computer. Particularly, the present invention relates to a wire/wireless keyboard and a control method therefor, in which the keyboard can be used as a wire keyboard if a main body connecting section of the keyboard is connected to the computer body, and the keyboard can be used as a wireless keyboard if the main body connecting section of the keyboard is disconnected from the computer body.

2. Description of the Prior Art

Generally, a computer includes a computer main body, a monitor and a data inputting device. The data inputting device is that through which a user can input data. The data inputting device is classified into: a keyboard for inputting letters and special characters, and a mouse, a touch ball, a touch pad and a stick point for inputting a position data of the cursor.

Figure 1:
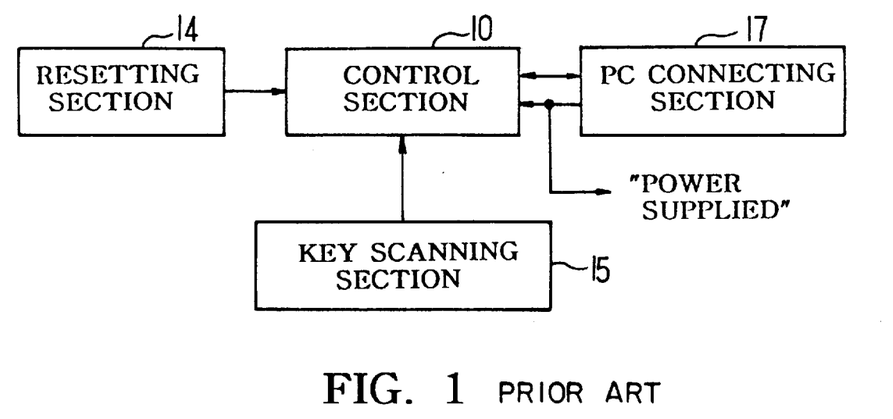
FIG. 1 illustrates the constitution of the conventional wire keyboard.

FIG. 1 illustrates the constitution of the conventional wire keyboard. Referring to FIG. 1, this conventional wire keyboard includes: a main body connecting section 17 for connecting the keyboard to a computer body; a key scanning section 15 for scanning the data inputted by a user; a control section 10 for transmitting the inputted data from the key scanning section 15 through the main body connecting section 17 to the computer body, for receiving commands from the computer body through the main body connecting section 17 to execute the relevant functions in accordance with the received commands, and for receiving power from the computer body; and a resetting section 14 for resetting the control section 10.

Figure 2:
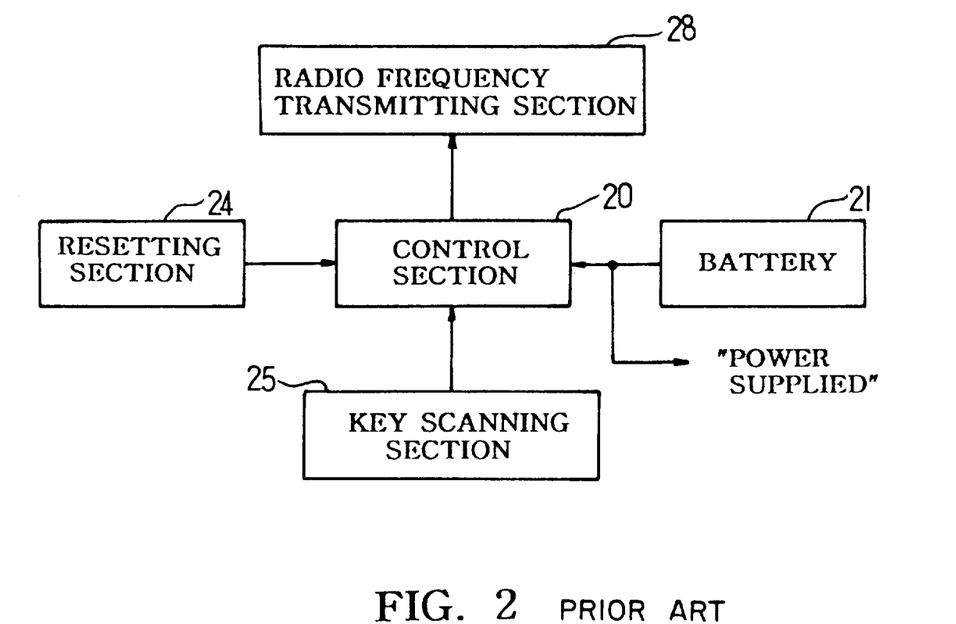
FIG. 2 illustrates the constitution of the conventional wireless keyboard.

FIG. 2 illustrates the constitution of the conventional wireless keyboard. Referring to FIG. 2, this conventional wireless keyboard includes: a key scanning section 25 for scanning the data inputted by a user; a resetting section 24 for resetting the keyboard; a battery 21 for supplying an operating power to the keyboard; a control section 20 for transferring the inputted data from the key scanning section 25 to a radio frequency transmitting section 28; and the radio frequency transmitting section 28 transmitting the data from the control section 20 through a wireless route.

In the above described conventional wire keyboard, however, the keyboard has to be connected to the computer body through a connector (a connecting cord or a connecting cable) which has a limited length. Therefore, the keyboard can be used within a certain limited distance from the computer body, this being a disadvantage. Therefore, the desire of a user who wants to install the keyboard remotely from the computer body cannot be satisfied. Thus the computer cannot be operated under the optimum condition in all the operating environments.

Meanwhile, the wireless keyboard has an advantage that it does not depend to the length of the connecting cable. However, it does not meet the desire of a user who prefers a wire keyboard. Further, it has to use a separate battery, and the battery has to be replaced. If a battery is not available, the keyboard cannot be used.

Thus the conventional keyboards cannot be used in a wire/wireless manner. Therefore they cannot satisfy the different desires of users under different operating environments. Therefore, they caused considerable inconvenience and limitations.

SUMMARY OF THE INVENTION

The present invention is intended to overcome the above described disadvantages of the conventional techniques.

Therefore it is an object of the present invention to provide a wire/wireless keyboard and a control method therefor, in which the keyboard can be used as a wire keyboard if a main body connecting section of the keyboard is connected to the computer body, and the keyboard can be used a wireless keyboard if the main body connecting section of the keyboard is disconnected from the computer body.

It is another object of the present invention to provide a wire/wireless keyboard in which, during the time when the key board is used as a wireless keyboard by separating the keyboard from the computer body, the control section of the keyboard is put to a power-down if there is no key input, and the control section is waken up if there is a key input, thereby minimizing the power consumption of the battery, and extending the life expectancy of the battery.

In achieving the above objects, the wire/wireless keyboard according to the present invention includes: a key scanning section for scanning key data such as numerals, letters and symbols; a main body connecting section for receiving power from a computer body, and for transmitting and receiving various data and clock signals to and from the computer body through a wire route; a wire/wireless detecting section for checking a power supply state of the main body connecting section to detect a connection status between the keyboard and the computer body; a power selecting section for supplying power to the keyboard upon sensing a supply of power from the main body connecting section, and for supplying a battery power to the keyboard upon detecting no power from the computer body; an ID number setting section for furnishing a pre-set ID number to a control section; the control section receiving power from the power selecting section, judging as to a wire mode or a wireless mode based on the status detection signals of the wire/wireless detecting section, controlling an output of scanned key data to main body connecting section upon encountering a wire mode, and controlling an output of ID numbers and key data to a radio frequency transmitting section upon encountering a wireless mode; and the radio frequency transmitting section converting the data of the control section to radio frequency signals through a signal converting procedure.

In another aspect of the present invention, the method for controlling a keyboard by using a radio frequency transmitting section, a key scanning section, an internal battery, a main body connecting section and a control section for discriminating a wire mode and a wireless mode according to the present invention includes the steps of: carrying out a basic assurance test (first step); discriminating a wire mode and a wireless mode based on a status detecting signal of a wire/wireless detecting section, setting "1" as a flag bit FB upon encountering a wire mode, and setting "0" as a flag bit FB upon encountering a wireless mode (second step); receiving key data through a key scanning section (third step); checking ghost keys among the scanned key data, and controlling to disregard the ghost keys (fourth step); judging as to whether the flag bit FB has been set or reset (fifth step); executing a wire mode to wire-transmit the scanned key data upon finding that the flag bit has been set at the fifth step (sixth step); executing a wireless mode to wireless-transmit the scanned key data upon finding that the flag bit has not been set at the fifth step (seventh step); and returning to the second step after executing the sixth and seventh steps (eighth step).

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

The preferred embodiment of the wire/wireless keyboard according to the present invention will be described referring to the attached drawings. The elements which have the same constitutions and functions will be assigned with the same reference codes.

Figure 3:
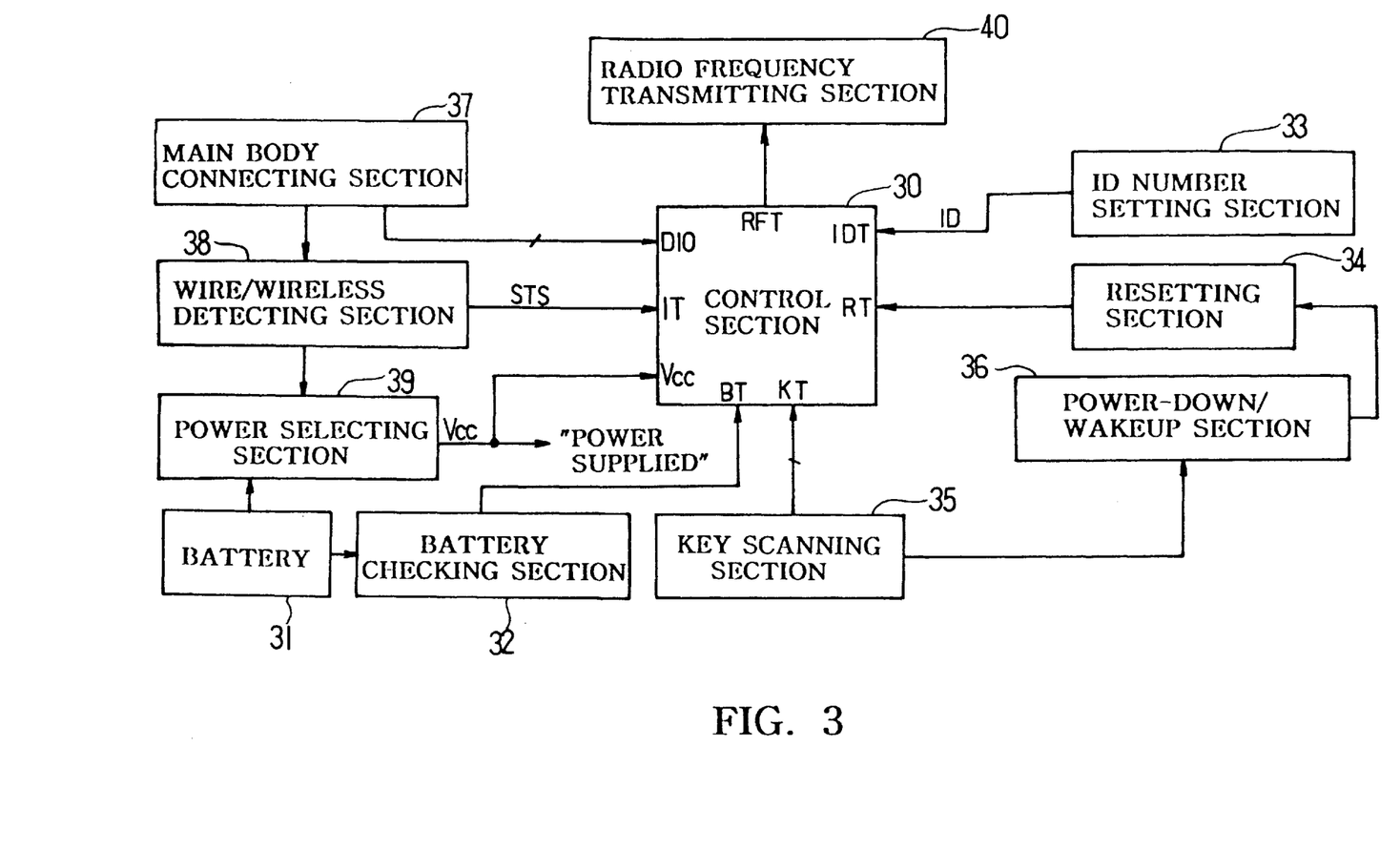
FIG. 3 is a block diagram showing the constitution of the wire/wireless keyboard according to the present invention.

FIG. 3 is a block diagram showing the constitution of the wire/wireless keyboard according to the present invention.

Referring to FIG. 3, reference code 30 indicates a control section. The control section 30 operates by receiving power from a power selecting section 39. The control section 30 judges based on a status detection signal STS of a wire/wireless detecting section 38 as to whether it is a wire mode or a wireless mode. If it is found to be a wire mode, the control section 30 controls the outputting of the scanned data of a key scanning section 35 to a main body connecting section 37, and controls the reception and transmission of various data to and from a computer body through the main body connecting section 37. On the other hand, if it is found to be a wireless mode, the control section controls the outputting of ID numbers of an ID number setting section 33 and key data of the key scanning section 35 to a radio frequency transmitting section 40.

Further, the control section 30 controls the transmission of check signals of a battery checking section 32 to the computer body. The control section 30 includes an output terminal OT which outputs high signals "1" to the wire/wireless detecting section 38 all the time. The control section 30 is put to a power-down after carrying out a wireless transmission of the data under a wireless mode, and is waken up from the power-down state upon receipt of a reset signal from a resetting section 34.

Reference code 31 indicates a battery. The battery 31 is installed within the keyboard to supply power to the keyboard under a wireless mode, when the main body connecting section 37 is disconnected from the computer body.

Reference code 32 indicates a battery checking section for checking the voltage status of the battery 31 so as to furnish the checked results to the control section 30.

Reference code 33 indicates an ID number setting section which supplies pre-set ID numbers to the control section 30. The section 33 sets a unique ID number to each set of radio frequency signals so that the computer body can recognize the radio frequency signals.

Reference code 34 indicates a resetting section which resets the control section 30 in accordance with the reset signals of a power-down/wakeup section 36.

Reference code 35 indicates a key scanning section which scans key data such as numerals, letters and symbols which are inputted through the keyboard.

Reference code 36 indicates the power-down/wakeup section which outputs reset signals to the resetting section 34 if a key is inputted through the scanning section 35 during the power-down of the control section 30.

Reference code 37 indicates a main body connecting section. This is a connecting part for a wire mode, receives power from the computer body, and transmits the scanned data to the computer body.

Reference code 38 indicates a wire/wireless detecting section. The section 38 checks the status of power supplied from the computer body through the main body connecting section 37 so as to detect the connection state between the keyboard and the computer body.

Reference code 39 indicates a power selecting section. When a power Vcc is supplied from the main body connecting section 37, this power source voltage is supplied to the keyboard. If power from the main body connecting section is not sensed, then the power of the internal battery 31 is supplied to the keyboard.

Meanwhile, the power Vcc which is supplied from the main body connecting section 37 to the power selecting section 39 is higher than the voltage $B^+$ of the battery 31.

Reference code 40 indicates a radio frequency transmitting section. Under the control of the control section 30, the radio frequency transmitting section 40 transmits the ID numbers and the scanned data to a radio frequency receiving section of the computer body.

Figure 4A:
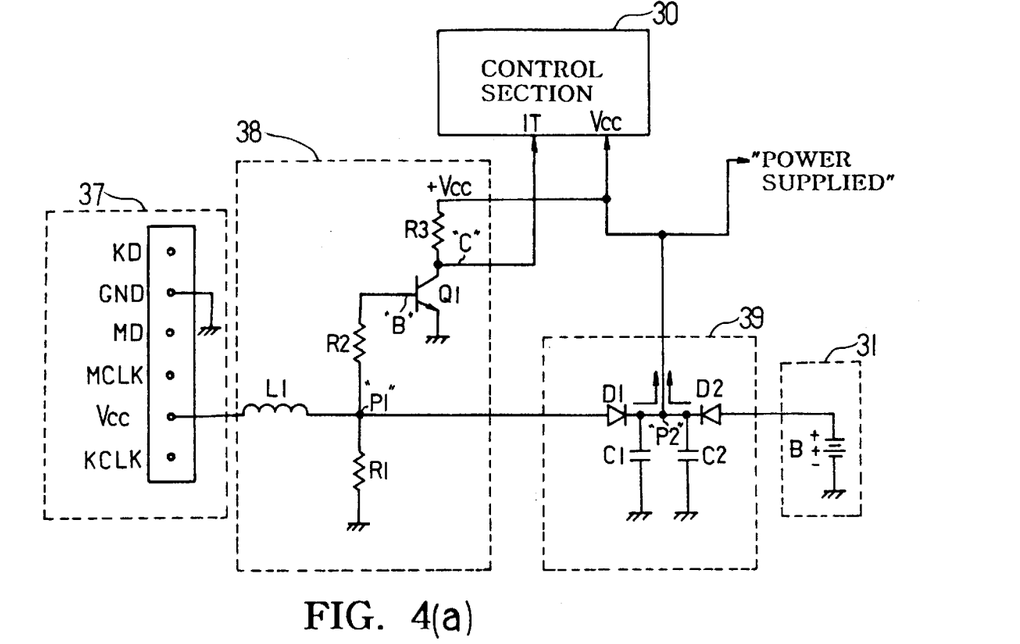
FIG. 4a illustrates a first embodiment of the wire/wireless detecting section of FIG. 3.
Figure 4B:
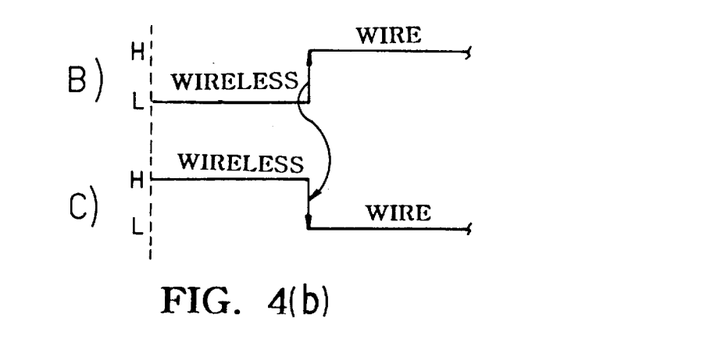
FIG. 4b is a timing chart showing the control signal status and the output signal status of a transistor of the wire/wireless detecting section.
Figure 5A:
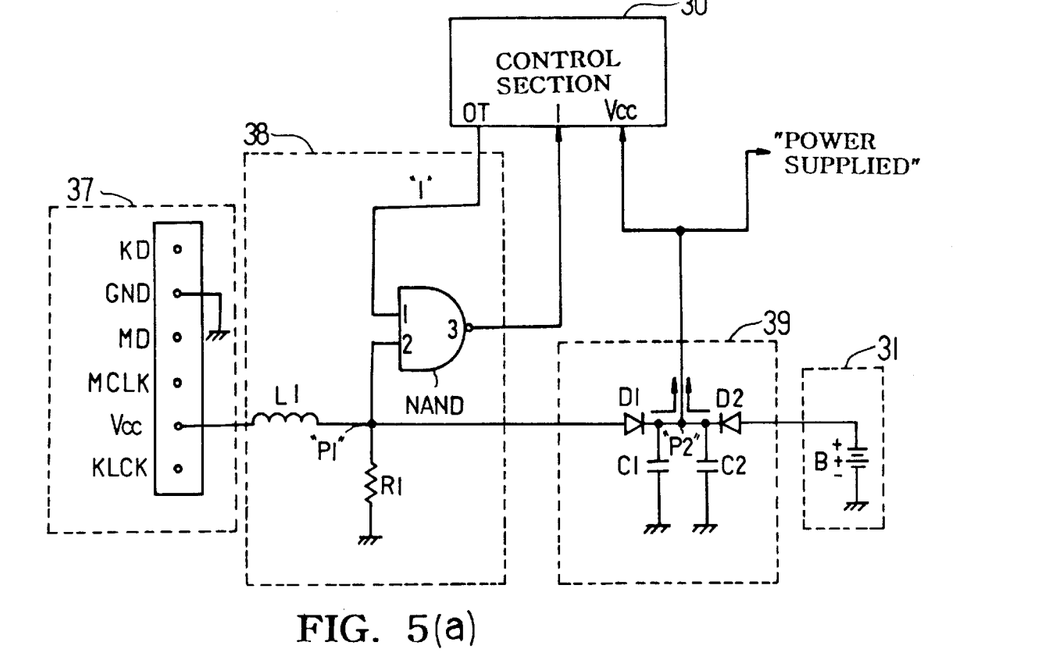
FIG. 5a illustrates a second embodiment of the wire/wireless detecting section of FIG. 3.
Figure 5B:
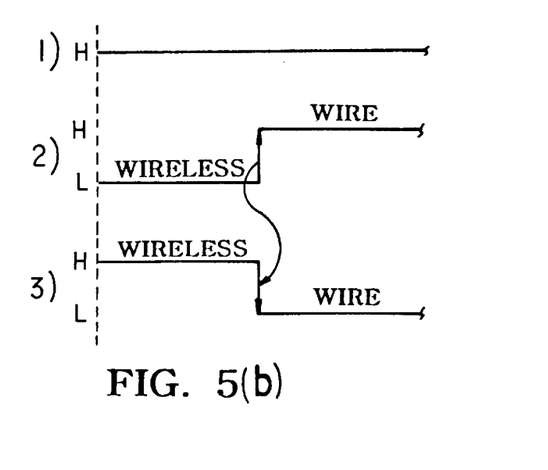
FIG. 5b is a timing chart showing the input signal status and the output signal status of a NAND gate of the wire/wireless detecting section.

FIG. 4a illustrates a first embodiment of the wire/wireless detecting section 38 of FIG. 3. FIG. 4b is a timing chart showing the control signal status and the output signal status of a transistor of the wire/wireless detecting section 38. FIG. 5a illustrates a second embodiment of the wire/wireless detecting section 38 of FIG. 3. FIG. 5b is a timing chart showing the input signal status and the output signal status of a NAND gate of the wire/wireless detecting section 38.

Referring to FIG. 4a, the first embodiment of the wire/wireless detecting section 38 includes: an ac removing coil L1 connected to the power source (Vcc) line of the main body connecting section 37; a voltage detecting resistor R1 for detecting the voltage which has passed through the ac removing coil L1; and a transistor Q1 with its base connected through another resistor R2 to the voltage detecting resistor R1, with its collector connected through a resistor R3 to an output terminal of the power selecting section 39, with its emitter grounded, and with its collector connected also to an input terminal IT of the control section 30.

Referring to FIG. 5a, the second embodiment of the wire/wireless detecting section 38 includes: an ac removing coil L1 connected to the power source (Vcc) line of the main body connecting section 37; a voltage detecting resistor R1 for detecting the voltage which has passed through the ac removing coil L1; and a NAND gate NAND for not-logic multiplying the voltage of the resistor R1 and high signals "1" of a microcomputer so as to output wire/wireless detection signals to the input terminal IT of the control section 30.

Referring to FIGS. 4a and 5a, the power selecting section 39 includes: a first diode D1 with its anode connected to the voltage detecting resistor R1 of the wire/wireless detecting section 38; and a second diode D2 with its anode connected to a positive voltage terminal of the battery 220, the cathodes of the first and second diodes D1 and D2 being connected together, and this connection point being connected to the power terminal Vcc of the control section 30 and to the power terminals of the respective circuit blocks.

Figure 6:
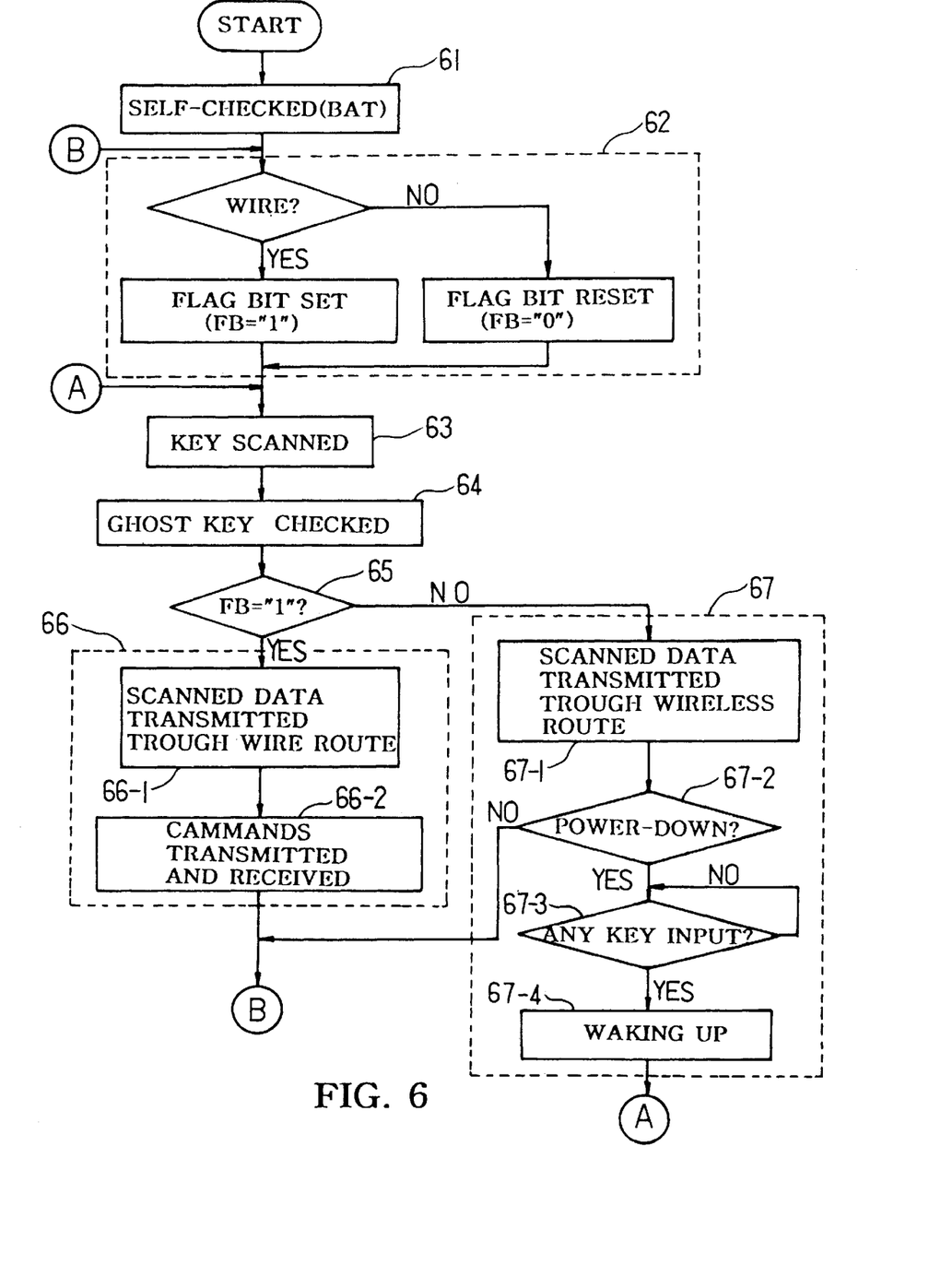
FIG. 6 is a flow chart showing the method for controlling the wire/wireless keyboard according to the present invention.

FIG. 6 is a flow chart showing the method for controlling the wire/wireless keyboard according to the present invention.

The operation of the apparatus of the present invention will be described in detail referring to the attached drawings.

Before describing the operation of the apparatus of the present invention referring to FIGS. 3 to 6, the following facts will be described.

The power selecting section 39 of FIGS. 4a and 5a supplies power to the keyboard if the power source Vcc from the main body connecting section 37 is sensed. If the power source from the main body connecting section is not sensed, the voltage of the internal battery is supplied to the keyboard. This will be described in more detail. The power source voltage which is supplied through the main body connecting section 37 is higher than the voltage B$^+$ of the internal battery 31. Therefore, if power is supplied from the main body connecting section 37, the first diode is turned on, while the second diode is turned off. Therefore, the power from the computer body is supplied to the control section 30 and to other circuit blocks of the keyboard.

On the other hand, if the computer body is not connected to the main body connecting section 37, there is no power from the computer body. Therefore, the first diode D1 of the power selecting section 39 is turned off, while the second diode D2 is turned on. Therefore, this time, the voltage B$^+$ of the battery 31 is supplied to the control section 30 and to other circuit blocks.

The main body connecting section 37 which is for connecting the keyboard to the computer body includes data lines KD and MD, clock lines KCLK and MCLK, a power line Vcc and a ground line GND.

Accordingly, when the keyboard is connected to the computer body by the power selecting section 39, the power from the computer body is supplied to the keyboard. On the other hand, when the keyboard is not connected to the computer body, the power of the internal battery is supplied to the keyboard as the power source. Thus the keyboard is made to receive power regardless of its connection to the computer body.

Meanwhile, at a first step 61 of FIG. 6, the control section 30 of the keyboard of FIG. 3 executes a basic assurance test, while another control section (not shown in the drawings) within a radio frequency receiving section of the computer body also executes a basic assurance test.

At a second step 62, when power is supplied from the computer body through the power line Vcc of the main body connecting section 37, the power is supplied through the coil L1 and the resistors R1 and R2 to the base "B" of the transistor Q1 within the wire/wireless detecting section 38. Under this condition, if the main body connecting section 37 is disconnected from the computer body, and so if there is no power supplied, then no voltage is detected from the voltage detecting resistor R1. Therefore, the transistor Q1 of the wire/wireless detecting section 38 is turned off, with the result that a high signal is supplied through the collector "C" of the transistor Q1 to the control section 30. This high signal is illustrated in FIG. 4b.

On the other hand, if the main body connecting section 37 is connected to the computer body, and so if there is power supplied, then power is detected from the voltage detecting resistor R1. Therefore, the transistor Q1 of the wire/wireless detecting section 38 is turned on, with the result that a low signal is supplied through the collector "C" of the transistor Q1 to the input terminal IT of the control section 30. This low signal is illustrated in FIG. 4b.

The above descriptions are about the first embodiment of the wire/wireless detecting section 38. Now the second embodiment will be described.

When power is supplied from the computer body through the power line Vcc of the main body connecting section 37, this power is inputted through the coil L1 and the resistors R1 and R2 into the second input terminal of the NAND gate NAND of the wire/wireless detecting section 38. Meanwhile, the first input terminal of the NAND gate NAND receives high signals "1" from the output terminal TO of the control section 30. Therefore, as shown in FIG. 5b, the output of the NAND gate becomes low signals to be inputted into the input terminal IT of the control section 30. On the other hand, if there is no power through the power line Vcc of the main body connecting section 37, the output of the NAND gate becomes high signals to be inputted into the input terminal IT of the control section 30.

The control section 30 judges as to a wire mode or wireless mode based on the high level "1" or the low level "0" of the status detection signals of the wire/wireless detecting section 38. That is, if the status detection signal is low, then it is recognized as a wire mode, and a flag bit FB is set to "1". On the other hand, if the status detection signal is high, then it is recognized as a wireless mode, and a flag bit FB is set to "0".

Then at a third step 63, the key scanning section 35 scans the key data through the key matrix, and the scanned data are supplied to the control section 30. At a fourth step 64, ghosts are checked among the scanned key data which are supplied from the control section 30. If it is judged as a ghost, the relevant key data are ignored, thereby accurately recognizing the real key data supplied through the key inputting.

At a fifth step 65, the control section 30 judges as to whether the flag bit FB has been set or reset. If the flag bit has been set, the system advances to the wire mode, while if the flag bit has been reset, then the system advances to the wireless mode.

At a sixth step 66, if the flag bit has been set at the fifth step 65, then the key data which have been scanned by the scanning section 35 is put to the wire mode in which the wire transmission is controlled. At this wire mode, the key data which have been scanned by the scanning section 35 are outputted to the main body connecting section 37 which is connected to a wire data port DIO, so as to transmit the data to the computer body through a wire route. Further, the control section 30 transmits and receives various signals such as status signals, command signals and the like through the main body connecting section 37 to and from the computer body. In this way, the operations are controlled in accordance with the command signals.

At a seventh step 67, if the flag bit has been reset at the fifth step 65, the scanned key data are subjected to a wireless mode, and the wireless mode is carried out in the following manner.

The scanned key data of the key scanning section 35 are supplied to the radio frequency transmitting section 40. If it is judged that there is no key input through the key scanning section 35, then the control section is put to a power-down for itself. The control section which has been put to a power-down is waken up in a manner described below. Thus if there is no key input, the control section 30 is put to a power-down as described above, and therefore, the consumption of the battery power is minimized.

Thus if the control section 30 is put to a power-down, then power-down/wakeup section 36 continuously checks as to whether key data are inputted through the key scanning section 35. If there is a key input, a reset control signal is outputted to the resetting section 34, and the resetting section 34 wakes up the control section 30 which has been put to a power-down. Thus the control section 30 is waken up to proceed the operation from the third step (key scanning step).

During the wireless mode, the control section 30 transmits the key data and the ID number of the ID number setting section 33 to the radio frequency transmitting section 40. Then the radio frequency transmitting section 40 converts the data to a predetermined radio frequency, and transmits them through a wireless route. Meanwhile, the control section 30 of the keyboard controls the transmission of the check signals of the battery checking section 32 to the computer body.

At an eighth step, the system returns to the second step 62 after executing the operations of the sixth and seventh steps 66 and 67.

In the keyboard of the present invention as described above, the connection status between the computer body and the main body connecting section of the keyboard is automatically judged. If it is judged that they are connected, then the power of the computer body is selected, and the wire mode is executed. On the other hand, if it is judged that they are disconnected from each other, then the internal battery is selected to supply the power from the battery, and the wireless mode is executed. Therefore, the keyboard of the present invention can be used as both a wire keyboard and as a wireless keyboard. Particularly, under a wireless mode, only if there is a key inputting, the control section is waken up, and therefore, the consumption of the battery power can be minimized.

According to the present invention as described above, the keyboard can be used as a wire keyboard if a main body connecting section of the keyboard is connected to the computer body, and the keyboard can be used as a wireless keyboard if the main body connecting section of the keyboard is disconnected from the computer body.

Thus one single keyboard can be used as both a wire keyboard and as a wireless keyboard, and therefore, the computer with this keyboard can be optimally adapted to various users' tastes, and various operating environments. Further, during the wireless mode, the control section is waken up from a power-down state, and therefore, the consumption of the battery power can be saved.

What is claimed is:

1. A wire/wireless keyboard comprising:
   a key scanning section for scanning key data including numerals, letters and symbols;
   a main body connecting section for receiving power from a computer body, and for transmitting and receiving various data and clock signals to and from the computer body through a wire route;
   a wire/wireless detecting section for checking a power supply state of said main body connecting section to detect a connection status between the keyboard and the computer body;
   a power selecting section for supplying power to the keyboard upon sensing a supply of power from said main body connecting section, and for supplying a battery power to the keyboard upon detecting no power from the computer body;
   an ID number setting section for furnishing a pre-set ID number to a control section;
   said control section receiving power from said power selecting section, judging as to a wire mode or a wireless mode based on status detection signals of said wire/wireless detecting section, controlling an output of scanned key data to said main body connecting section upon encountering a wire mode, and controlling an output of ID numbers and key data to a radio frequency transmitting section upon encountering a wireless mode; and
   said radio frequency transmitting section converting the data of said control section to radio frequency signals through a signal converting procedure.

2. The wire/wireless keyboard as claimed in claim 1, further comprising a battery checking section for checking a voltage status of said battery so as to furnish checked results to said control section; and
   said control section further comprising a function of sending check signals of said battery checking section to the computer body.

3. The wire/wireless keyboard as claimed in claim 1, wherein said control section further comprises a function of being put to a power-down after controlling a wireless transmission of data; and
   the keyboard further comprising:
   a power-down/wakeup section for outputting a reset control signal for resetting said control section from a power-down state upon scanning a key input by said key scanning section; and
   a resetting section for resetting said control section.

4. The wire/wireless keyboard as claimed in claim 1, wherein said wire/wireless detecting section comprises:
   an ac removing coil connected to the power source line of said main body connecting section;
   a voltage detecting resistor for detecting a voltage which has passed through said ac removing coil; and
   a transistor with its base connected through another resistor to said voltage detecting resistor, with its collector connected through a resistor to an output terminal of said power selecting section, with its emitter grounded, and with its collector connected also to an input terminal of said control section.

5. The wire/wireless keyboard as claimed in claim 1, wherein said control section further comprises an output terminal for outputting high level signals to said wire/wireless detecting section at all times; and
   said wire/wireless detecting section comprises:
   an ac removing coil connected to said power source line of said main body connecting section;
   a voltage detecting resistor for detecting a voltage which has passed through said ac removing coil; and
   a NAND gate for not-logic multiplying a voltage of said resistor and high signals of a microcomputer so as to output wire/wireless detection signals to an input terminal of said control section.

6. The wire/wireless keyboard as claimed in claim 1, wherein a power source voltage supplied through said main body connecting section to the computer body is higher than a voltage of said battery.

7. The wire/wireless keyboard as claimed in claim 1, wherein said power selecting section further comprises:

a first diode with its anode connected to said voltage detecting resistor of said wire/wireless detecting section; and a second diode with its anode connected to a positive voltage terminal of said battery, cathodes of said first and second diodes being connected together, and this connection point being connected to a power terminal of said control section and to power terminals of respective circuit blocks.

8. The wire/wireless keyboard as claimed in claim 7, wherein said power selecting section further comprises:

a capacitor connected from the cathode of said first diode to ground; and another capacitor connected from the cathode of said second diode to ground.

9. A method for controlling a keyboard by using a radio frequency transmitting section, a key scanning section, an internal battery, a main body connecting section and a control section for discriminating a wire mode and a wireless mode, comprising the steps of:

carrying out a basic assurance test (first step);

discriminating a wire mode and a wireless mode based on a status detecting signal of a wire/wireless detecting section, setting "1" as a flag bit upon encountering a wire mode, and setting "0" as a flag bit upon encountering a wireless mode (second step);

receiving key data through a key scanning section (third step);

checking ghost keys among scanned key data, and controlling to disregard the ghost keys (fourth step);

judging as to whether said flag bit FB has been set or reset (fifth step);

executing a wire mode to wire-transmit the scanned key data upon finding that said flag bit has been set at the fifth step (sixth step);

executing a wireless mode to wire less-transmit the scanned key data upon finding that said flag bit has not been set at the fifth step (seventh step); and returning to the second step after executing the sixth and seventh steps (eighth step).

10. The method as claimed in claim 9, wherein the sixth step at a wire mode comprises the substeps of:

controlling a wire transmission of scanned key data; and controlling transmissions and receptions of various signals including status signals and command signals to and from the computer body.

11. The method as claimed in claim 9, wherein the seventh step at a wireless mode comprises the substep of:

transmitting an ID number together with the data during a wireless transmission of data.

12. The method as claimed in claim 9, wherein the seventh step at a wireless mode further comprises the substeps of:

transmitting scanned key data through a wireless route;

judging on a power-down status after a wireless transmission of data, returning to the second step upon encountering no power-down status, and advancing to a next step upon encountering a power-down status; and checking continuously as to whether there is an inputting of scanned key data in a case of power-down at a preceding step, waking up said control section upon encountering an input, and then, proceeding to the third step.

13. The method as claimed in claim 9, further comprising the step of controlling a transmission of check signals from said battery checking section to the computer body.

* * * * *